US 6,666,387 B2

(12) United States Patent  (10) Patent No.: US 6,666,387 B2
Kubo                      (45) Date of Patent:    Dec. 23, 2003

(54) FUEL INJECTOR OF INTERNAL COMBUSTION ENGINE

(75) Inventor: Masaaki Kubo, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 233 days.

(21) Appl. No.: 09/982,955

(22) Filed: Oct. 22, 2001

(65) Prior Publication Data
US 2002/0063171 A1 May 30, 2002

(30) Foreign Application Priority Data

Nov. 28, 2000 (JP) ....................... 2000-360774

(51) Int. Cl.$^7$ ................................................ B05B 1/30
(52) U.S. Cl. ........................ 239/533.12; 239/533.2; 239/463; 239/490
(58) Field of Search ................. 239/5, 533.2, 533.7, 239/533.9, 533.11, 533.12, 585.1, 585.2, 585.3, 585.4, 585.5, 463, 490

(56) References Cited

U.S. PATENT DOCUMENTS

| 4,588,415 A | * | 5/1986 | Zaweski et al. ............... 44/326 |
| 6,042,028 A | * | 3/2000 | Xu ........................... 239/585.1 |
| 6,213,086 B1 | * | 4/2001 | Chmela et al. ............. 123/276 |
| 6,216,662 B1 | * | 4/2001 | Sapsford ..................... 123/301 |
| 6,422,198 B1 | * | 7/2002 | VanBrocklin et al. ....... 123/294 |

OTHER PUBLICATIONS

Miyajima et al., "A Study on Fuel Spray Pattern Control of Fuel Injector of Gasoline Direct Injection Engines", *SAE Paper 2000–01–1045*, (2000), pp. 283–291, Society of Automotive Engineers, Inc.

* cited by examiner

Primary Examiner—Michael Mar
Assistant Examiner—Thach H Bui
(74) Attorney, Agent, or Firm—Foley & Lardner

(57) ABSTRACT

In a fuel injector with a swirler creating swirling fuel flow, a projected portion is formed as an orifice nozzle tip at an opening end of a nozzle hole. The projected portion includes a first sloped portion having a sloped surface whose height h1, measured in the orifice-axis direction, is dimensioned to gradually increase along the swirling-fuel-flow direction, and a second sloped portion having a sloped surface whose height h2, measured in the orifice-axis direction, is dimensioned to gradually decrease along the swirling-fuel-flow direction. In a θ-h coordinate system constructed by a θ-axis representing the angular position of the orifice nozzle tip and a h-axis representing the axial height of the projected portion, the projected portion is dimensioned so that the absolute value $|dh1/d\theta|_{max}$ of the gradient of the first sloped surface is dimensioned to be less than the absolute value $|dh2/d\theta|_{max}$ of the gradient of the second sloped surface.

19 Claims, 10 Drawing Sheets

U · · · CIRCUMFERENTIAL FLOW VELOCITY COMPONENT

W · · · AXIAL FLOW VELOCITY COMPONENT

FUEL INJECTOR OF INTERNAL COMBUSTION ENGINE

TECHNICAL FIELD

The present invention relates to a fuel injector of an internal combustion engine, and particularly to the improvement in the shape of an orifice nozzle tip of the fuel injector.

BACKGROUND ART

In recent years, there have been proposed and developed various swirl-type DI fuel injectors suited to direct-injection (DI) gasoline engines. One such swirl-type DI fuel injector has been disclosed in SAE Paper 2000-01-1045. The swirl-type DI fuel injector often uses a swirler located upstream of a conically or semi-spherically ended needle valve in order to give rotational momentum to fuel. FIG. 14 shows an L-cut orifice nozzle disclosed in the SAE Paper 2000-01-1045. As seen in FIG. 14, an axis of nozzle hole (orifice) 4 of the L-cut orifice nozzle is identical to an axis 24 of a substantially cylindrical nozzle body 6. The L-cut orifice nozzle tip (hereinafter is referred to as a "projected portion 20") is semi-cylindrical in shape and has a pair of rectangular flat wall surfaces (22a, 22b) parallel to the orifice axis identical to axis 24 of the nozzle body. In the fuel injector with the L-cut orifice nozzle disclosed in the SAE Paper 2000-01-1045, by means of the swirler the rotational momentum is given to the fuel in the orifice, so that the fuel flows or rotates in the circumferential direction of the nozzle hole.

SUMMARY OF THE INVENTION

As shown in FIG. 13, fuel is injected or sprayed from the nozzle hole of the L-cut orifice nozzle at a so-called fuel-flow angle (simply, a flow angle $\phi$) between a plane normal to the orifice axis and the direction of fuel flow as viewed from the vertical cross section. Flow angle $\phi$ is based on both an axial fuel flow velocity component W in the orifice-axis direction and a circumferential fuel flow velocity component U in the circumferential direction of nozzle hole 4 (exactly, rotating or swirling fuel flow direction), and defined or represented by the following expression (1).

$$\phi = \tan^{-1}(W/U) \qquad (1)$$

On the other hand, a spray angle $\alpha$ of the fuel is also based on both axial fuel flow velocity component W in the orifice-axis direction and circumferential fuel flow velocity component U in the circumferential direction of nozzle hole 4, and represented by the following expression (2).

$$\alpha = 2\tan^{-1}(U/W) \qquad (2)$$

Therefore, the relationship between flow angle $\phi$ and spray angle $\alpha$ is represented as the following expression (3).

$$\phi = 90° - (\alpha/2) \qquad (3)$$

FIG. 15 shows the spray pattern of fuel injected from nozzle hole 4 with flow angle $\phi$ and spray angle $\alpha$. As can be seen from the spray shape shown in FIG. 15, a first collected fuel portion Xc and a second collected fuel portion Yc are produced. In FIG. 15, a plurality of arrows indicate directions of fuel injection (that is, swirling-fuel-flow direction). As seen from the perspective view shown in FIG. 14, on the assumption that a reference plane is a plane normal to the orifice axis and cutting a section of projected portion 20 that a height h of projected portion 20 measured in the orifice-axis direction relatively becomes smallest, and an intersection point between a central axis of the nozzle hole (i.e., the orifice axis) and the reference plane (h=0) is chosen as an origin O, an angle $\theta$ is measured in a circumferential direction from a directed line radially extending from the origin O and including the intersection of the reference plane and rectangular wall surface 22a of the semi-cylindrical orifice nozzle tip. The height h of projected portion 20 at a certain angular position is axially measured from the reference plane. In the L-cut orifice nozzle, as shown in the fuel-spray angle characteristic shown in FIG. 16, spray angle $\alpha$ varies depending on angle $\theta$. The spray pattern shown by the spray section of FIG. 15 is described in detail in reference to FIGS. 17–19. FIG. 17 shows a developed shape of semi-cylindrical projected portion 20 (the orifice nozzle tip facing the combustion chamber) in a $\theta$-h coordinate system corresponding to a cylindrical coordinate system in which a $\theta$-axis represents angle $\theta$ measured in the circumferential direction from the previously-noted directed line, whereas an h-axis represents height h of projected portion 20 at a certain angular position. As can be seen from the developed shape of semi-cylindrical projected portion 20 shown in FIG. 17 by way of the $\theta$-h coordinate system, the fuel is injected or sprayed out of the nozzle hole at the flow angle $\phi$ as indicated by the arrows P, Q, and R, but part of the fuel tends to impinge on rectangular flat wall surface 22b of the orifice nozzle tip (see the arrow Q of FIG. 17). As explained in more detail in reference to FIGS. 18 and 19, fuel sprayed through a first zone a of nozzle hole 4 produces a fuel spray within an angular range A. Fuel sprayed through a second zone b of nozzle hole 4 impinges on rectangular flat wall surface 22b and then flows along the wall surface. As a result of this, second collected fuel portion Yc (see FIG. 15) is produced in the direction substantially parallel to rectangular flat wall surface 22b and indicated by the arrow B. Fuel passing through a third zone o of nozzle hole 4 flows along the inner peripheral wall surface of semi-cylindrical projected portion 20, and then sprayed through a section f of the tip end of projected portion 20, and thus produces a fuel spray within an angular range F. Fuel passing through a fourth zone d of nozzle hole 4 flows along the inner peripheral wall surface of semi-cylindrical projected portion 20, and then sprayed out in the direction indicated by the arrow G. Owing to the fuel sprayed out in the direction indicated by the arrow G, first collected fuel portion Xc (see FIG. 15) is produced. In contrast, there is no fuel sprayed through a section e of the tip end of projected portion 20. When the fuel evaporates in the first collected fuel portion Xc, a comparatively rich air/fuel mixture results. For this reason, locating a spark plug at a position corresponding to first collected fuel portion Xc carries the advantage of reducing fuel consumption and emissions. That is, by way of better setting of the spark plug to the position corresponding to first collected fuel portion Xc, it is possible to efficiently feed the lowest possible fuel required in a lean or ultra-lean stratified combustion mode to the spark plug. This enhances the combustion stability in the stratified combustion mode.

As discussed above, in the conventional swirl-type DI fuel injector disclosed in the SAE Paper 2000-01-1045, it is possible to enhance an ignitability owing to the formation of first corrected fuel portion Xc, however, second corrected fuel portion Yc is simultaneously formed at an angular position spaced apart from the angular position of first corrected fuel portion Xc by the fuel impinging on and rebounded from rectangular flat wall surface 22b of the semi-cylindrical orifice nozzle tip (projected portion 20).

The two corrected fuel portions Xc and Yc tend to form a denser air/fuel mixture, thus increasing unburned hydrocarbons (HCs). First corrected fuel portion Xc brings the advantage enhancing the ignitability, whereas second corrected fuel portion Yc never offers the benefit of enhanced ignitability. That is, second corrected fuel portion Yc merely causes unburnt HC emissions.

Accordingly, it is an object of the invention to provide a fuel injector of an in-cylinder direct-injection (DI) gasoline engine, which avoids the aforementioned disadvantages.

It is another object of the invention to provide a swirl-type DI fuel injector of a DI gasoline engine, which is capable of achieving an excessively wide stratified combustion air-fuel ratio (AFR) zone and reduced fuel consumption and emissions (or improved emission control performance).

In order to accomplish the aforementioned and other objects of the present invention, a fuel injector of an internal combustion engine comprises a nozzle body having a nozzle hole formed in a tip of the nozzle body and a valve seat formed in the nozzle body upstream of the nozzle hole, a needle valve movable in a direction of an axis of the nozzle body to open and close the nozzle hole by moving the needle valve apart from the valve seat and by seating the needle valve on the valve seat, a swirler located upstream of the valve seat to give rotational momentum to fuel to be injected from the nozzle hole and to create swirling fuel flow, a projected portion whose inner peripheral wall is continuous with an inner peripheral wall surface of the nozzle hole, the projected portion being formed on an edge portion of an opening end of the nozzle hole so that a height of the projected portion, measured in a direction of an orifice axis of the nozzle hole, varies along a circumferential direction of the nozzle hole, the projected portion comprising a first sloped portion having a sloped surface that a height h1 of the sloped surface, measured in the orifice-axis direction, is dimensioned to gradually increase along a direction of the swirling fuel flow, and a second sloped portion having a sloped surface that a height h2 of the sloped surface, measured in the orifice-axis direction, is dimensioned to gradually decrease along the swirling-fuel-flow direction, a gradient of the sloped surface of the first sloped portion being defined by $dh1/d\theta$ and a gradient of the sloped surface of the second sloped portion being defined by $dh2/d\theta$, in a $\theta$-h coordinate system corresponding to a cylindrical coordinate system in which a reference plane is defined as a plane normal to the orifice axis and cutting a section of the projected portion that the height of the projected portion becomes smallest, an intersection point between the orifice axis and the reference plane is chosen as an origin, an angular position of a point of the edge portion of the opening end of the nozzle hole with respect to the origin serving as a reference is represented by an angle $\theta$ ranging from 0° to 360°, the height of the projected portion in the orifice-axis direction with respect to the reference plane serving as a reference is represented by a height h, a $\theta$-axis representing the angle $\theta$ is taken as an axis of abscissa, and an h-axis representing the height h is taken as an axis of ordinate, and the projected portion being dimensioned to satisfy an inequality:

$$|dh1/d\theta|_{max} < |dh2/d\theta|_{max}$$

where $|dh1/d\theta|_{max}$ is an absolute value of a maximum value of the gradient of the sloped surface of the first sloped portion, and $|dh2/d\theta|_{max}$ is an absolute value of a maximum value of the gradient of the sloped surface of the second sloped portion.

According to another aspect of the invention, a fuel injector of a gasoline direct-injection internal combustion engine comprises a nozzle body having a nozzle hole formed in a tip of the nozzle body and a valve seat formed in the nozzle body upstream of the nozzle hole, a needle valve movable in a direction of an axis of the nozzle body to open and close the nozzle hole by moving the needle valve apart from the valve seat and by seating the needle valve on the valve seat, a swirler located upstream of the valve seat to give rotational momentum to fuel to be injected from the nozzle hole and to create swirling fuel flow, a substantially cylindrical-hollow projected portion whose inner peripheral wall is parallel to an orifice axis of the nozzle hole and is continuous with an inner peripheral wall surface of the nozzle hole, the projected portion being formed on an edge portion of an opening end of the nozzle hole so that a height of the projected portion, measured in a direction of the orifice axis corresponding to the nozzle-body axis, varies along a circumferential direction of the nozzle hole, the projected portion comprising a first sloped portion having a sloped surface that a height h1 of the sloped surface, measured in the orifice-axis direction, is dimensioned to gradually increase along a direction of the swirling fuel flow, the first sloped portion sloping up from a first angular position to a second angular position advanced in the swirling-fuel-flow direction relative to the first angular position moderately at a gradient less than a flow angle $\phi$ of fuel injected from the orifice nozzle, the flow angle $\phi$ between a plane normal to the orifice axis and a fuel-flow direction as viewed from a cross section of the orifice-axis direction being defined by an expression $\phi = \tan^{-1}(W/U)$, where W is an axial fuel flow velocity component in the orifice-axis direction and U is a circumferential fuel flow velocity component in the circumferential direction of the nozzle hole, and a second sloped portion having a sloped surface that a height h2 of the sloped surface, measured in the orifice-axis direction, is dimensioned to gradually decrease along the swirling-fuel-flow direction, the gradient of the sloped surface of the first sloped portion being defined by $dh1/d\theta$ and a gradient of the sloped surface of the second sloped portion being defined by $dh2/d\theta$, in a $\theta$-h coordinate system corresponding to a cylindrical coordinate system in which a reference plane is defined as a plane normal to the orifice axis and cutting a section of the projected portion that the height of the projected portion becomes smallest, an intersection point between the orifice axis and the reference plane is chosen as an origin, an angular position of a point of the edge portion of the opening end of the nozzle hole with respect to the origin serving as a reference is represented by an angle $\theta$ ranging from 0° to 360°, the height of the projected portion in the orifice-axis direction with respect to the reference plane serving as a reference is represented by a height h, a $\theta$-axis representing the angle $\theta$ is taken as an axis of abscissa, and an h-axis representing the height h is taken as an axis of ordinate, and the projected portion being dimensioned to satisfy an inequality:

$$|dh1/d\theta|_{max} < |dh2/d\theta|_{max}$$

where $|dh1/d\theta|_{max}$ is an absolute value of a maximum value of the gradient of the sloped surface of the first sloped portion, and $|dh2/d\theta|_{max}$ is an absolute value of a maximum value of the gradient of the sloped surface of the second sloped portion.

The other objects and features of this invention will become understood from the following description with reference to the accompanying drawings.

DESCRIPTION OF THE PREFERRED EMBODIMENTS

Figure 1:
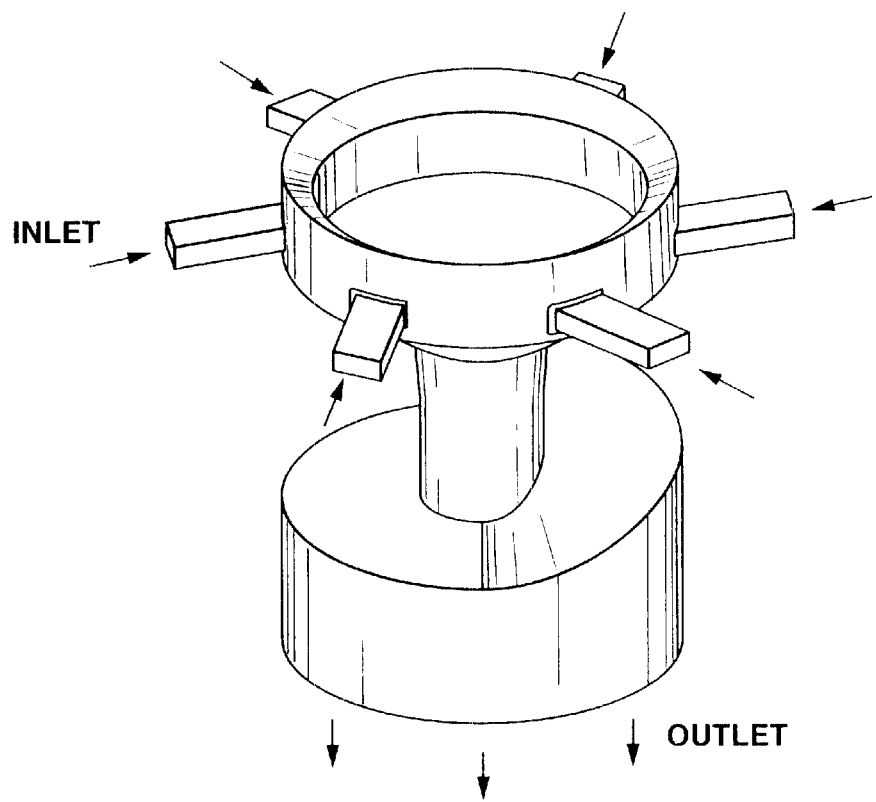
FIG. 1 is a perspective view illustrating the outline of a computational mesh grid for a numerical simulation used to simulate the fuel behavior nearby the opening end of an orifice nozzle tip in a first embodiment of a DI fuel injector of a DI gasoline engine.
Figure 2:
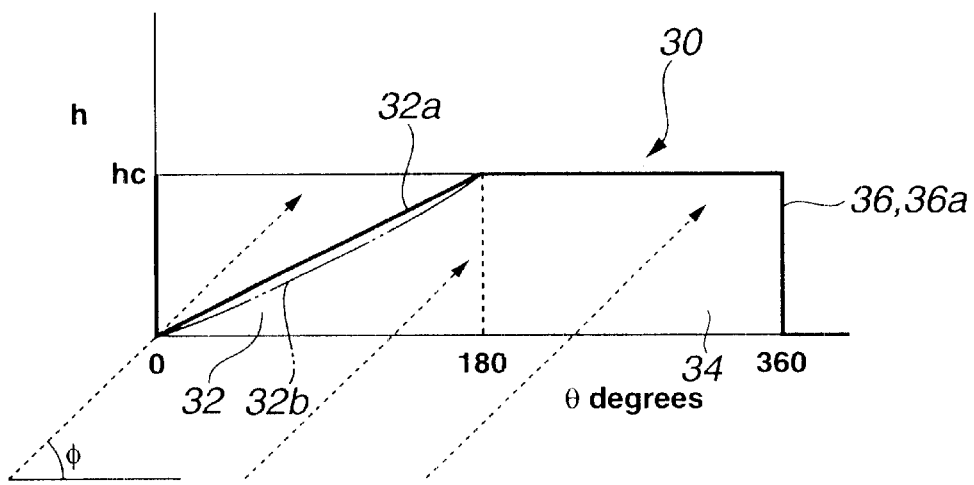
FIG. 2 is an explanatory view showing a developed shape of a substantially cylindrical-hollow projected portion 30 (an orifice nozzle tip of the fuel injector of the first embodiment) by way of a θ-h coordinate system corresponding to a cylindrical coordinate system. simulation result of the fuel behavior (spray pattern) of the fuel injector of the first embodiment having the improved orifice nozzle tip shape.
Figure 3:
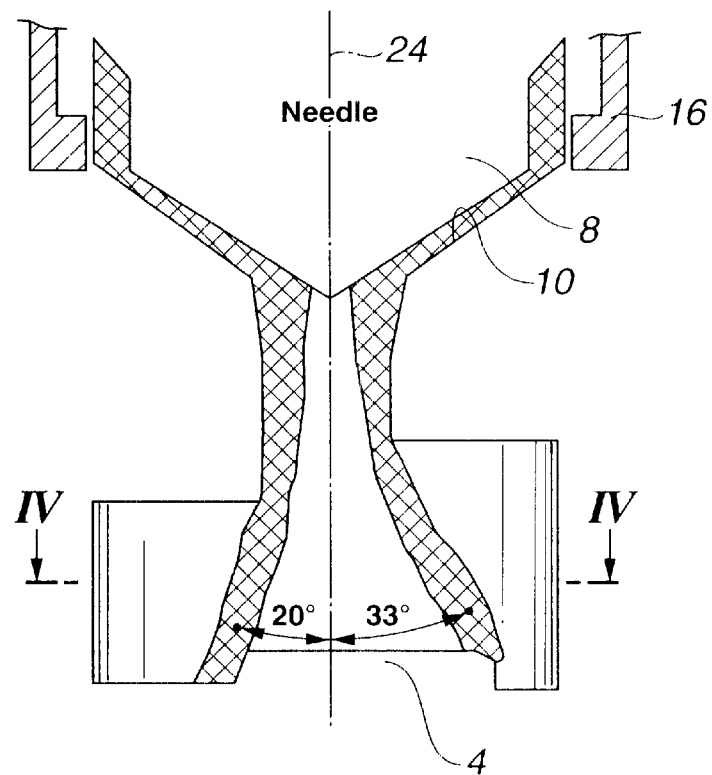
Figure 4:
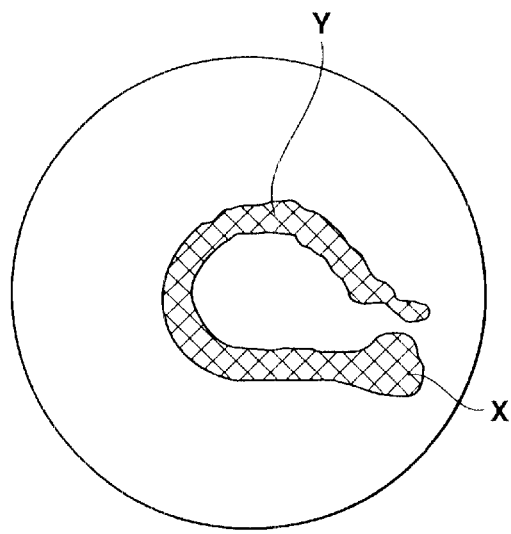
FIG. 4 is a horizontal cross section showing the simulation result of the spray pattern of the cross section taken along the line IV—IV of FIG. 3.
Figure 5:
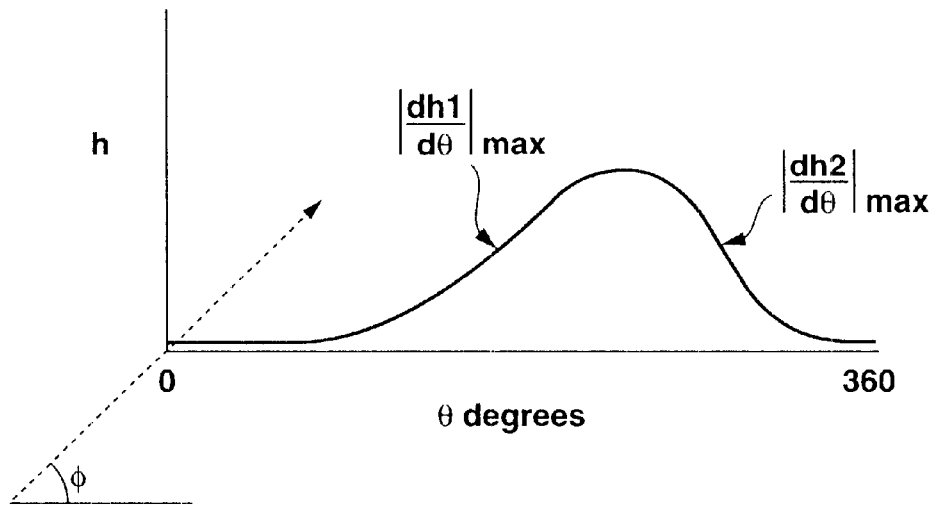
FIG. 5 is an explanatory view showing the relationship between an absolute value $|dh1/d\theta|_{max}$ of a maximum value of a gradient of a first sloped portion and an absolute value $|dh2/d\theta|_{max}$ of a maximum value of a gradient of a second sloped portion.
Figure 15:
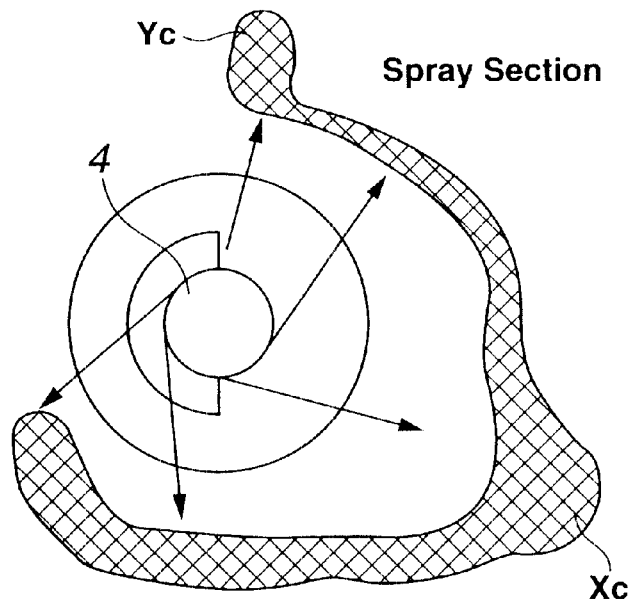
FIG. 15 is an explanatory view showing the spray pattern of the horizontal cross section of the prior art fuel injector having the L-cut orifice nozzle tip shape.
Figure 16:
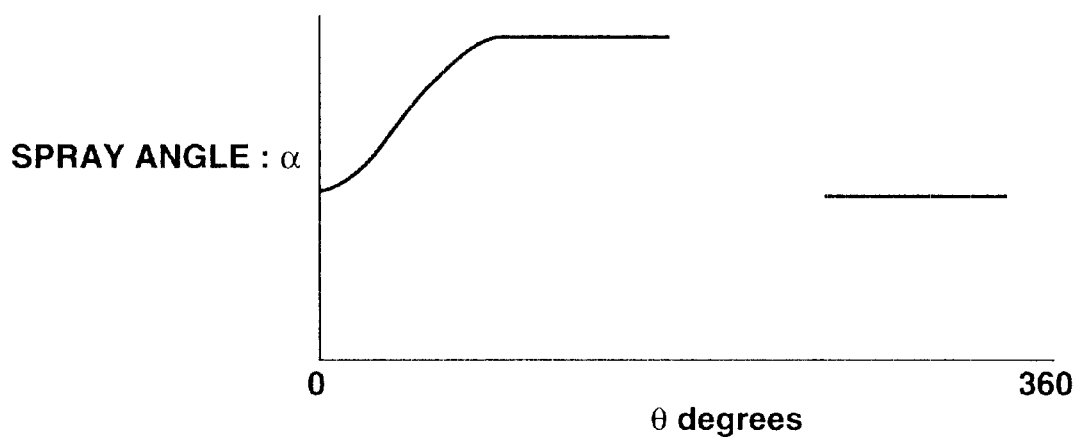
FIG. 16 is a graph showing the fuel spray angle α characteristic with regard to angle θ representative of the angular position in the circumferential direction in the prior art fuel injector having the L-cut orifice nozzle tip shape.
Figure 17:
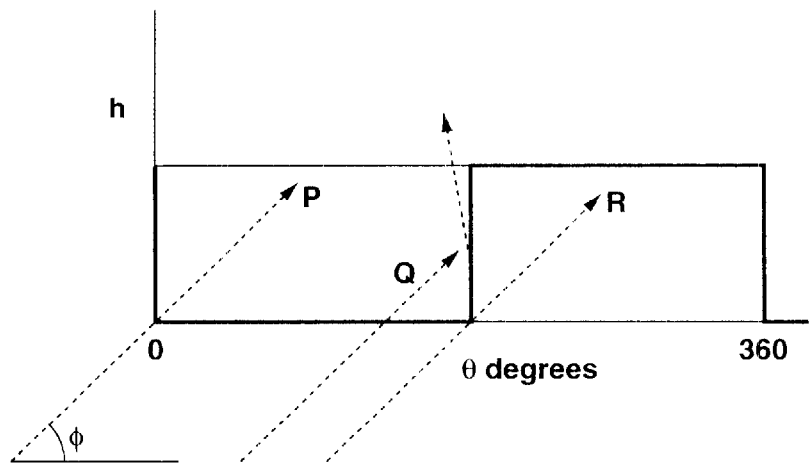
FIG. 17 is an explanatory view showing the developed shape of the projected portion 20 (the L-cut orifice nozzle tip of the prior art fuel injector) by way of the θ-h coordinate system.
Figure 18:
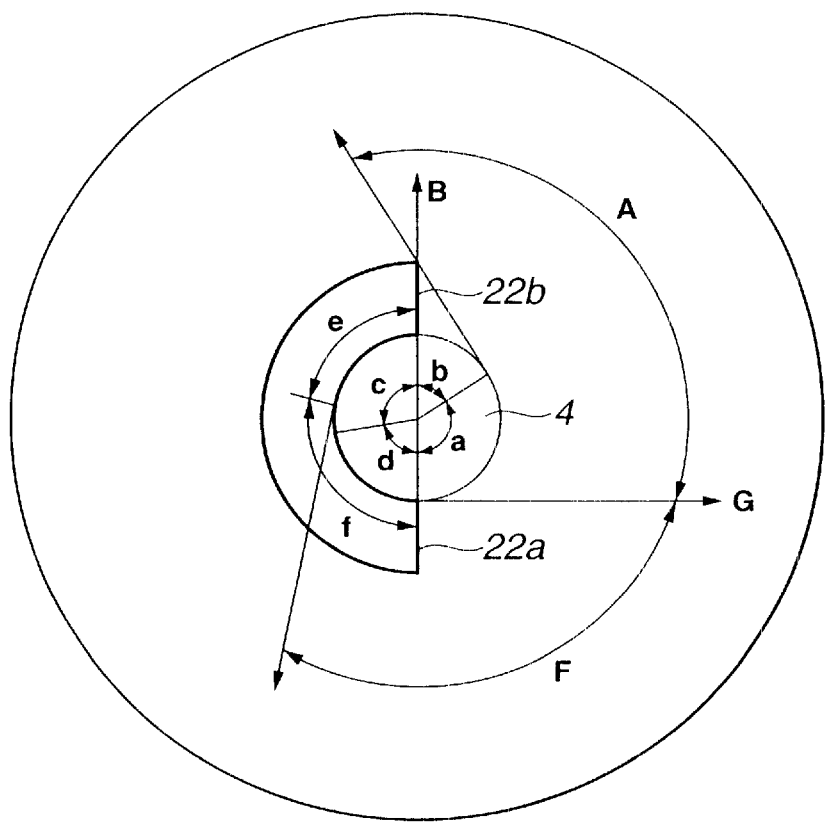
FIG. 18 is an explanatory view showing the fuel behavior of fuel sprayed out of the opening end of the L-cut orifice nozzle tip of the conventional fuel injector.
Figure 19:
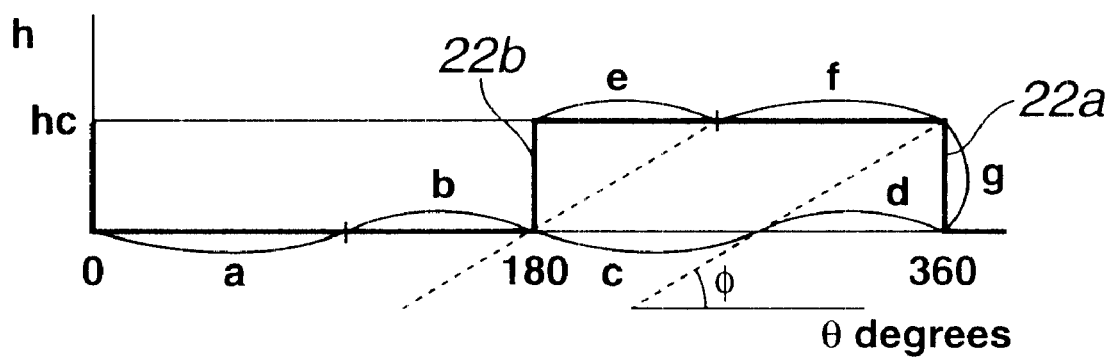
FIG. 19 is an explanatory view showing the shape of the conventional L-cut orifice nozzle tip by way of the θ-h coordinate system.

Referring now to the drawings, particularly to FIGS. 1–5, the swirl-type fuel injector of the invention is exemplified in an in-cylinder direct-injection (DI) gasoline engine. FIG. 1 shows the computational mesh grid for the numerical simulation used to simulate or analyze the fuel behavior or fuel spray pattern by way of three-dimensional viscous fluid analysis, in the swirl-type DI fuel injector of the first embodiment having a first specified shape of an orifice nozzle tip (a projected portion 30). FIG. 2 shows the developed shape of projected portion 30 in the θ-h coordinate system. The θ-h coordinate system corresponding to a cylindrical coordinate system is determined or defined as follows. Firstly, a reference plane is defined as a plane normal to the orifice axis and cutting a section of projected portion 30 that a height h of projected portion 30 measured in the orifice-axis direction relatively becomes smallest. Second, an intersection point between a central axis of nozzle hole 4 (i.e., nozzle-body axis 24 or the orifice axis) and the reference plane (h=0) is chosen as an origin O. Third, an angular position of a point of the circumferentially-extending edge portion of the opening end of the orifice nozzle (projected portion 30) with respect to origin O serving as a reference is represented by angle θ ranging from 0° to 360°. Fourth, the height of projected portion 30 in the orifice-axis direction with respect to the reference plane serving as a reference is represented by height h. Height h of projected portion 30 varies along the circumferential direction of nozzle hole 4. In the θ-h coordinate system, a θ-axis representative of angle θ that is measured from a predetermined radially-extending directed line to the circumferential direction of nozzle hole 4 is taken as an axis of abscissa, whereas an h-axis representative of height h of projected portion 30 whose height varies in the circumferential direction of nozzle hole 4 is taken as an axis of ordinate. That is, the heavy line shown in FIG. 2 indicates variations in height h of the orifice nozzle tip (projected portion 30) at every angular position (θ=0°–360°) of the orifice nozzle tip. The orifice nozzle tip (projected portion 30) is substantially annular or substantially cylindrical hollow in shape and formed continuously in the circumferential direction of nozzle hole 4. The angular position of the edge portion of the opening end of the orifice nozzle tip (projected portion 30) corresponding to θ=0° is identical to that of the orifice nozzle tip corresponding to θ=360°. That is, angle θ represents the relative-position relationship of every section of the circumferentially-extending edge portion of the opening end of orifice nozzle 4. Projected portion 30 of the fuel injector of the first embodiment has an inner peripheral wall parallel to the orifice axis and continuous with the inner peripheral wall surface of nozzle hole (orifice) 4. Projected portion 30 is formed within an angular range defined by 0°≦θ≦360° in the θ-h coordinate system. As clearly seen in FIG. 2, projected portion 30 is formed with a first sloped portion 32 having a sloped surface 32a that has a constant gradient (that is, a moderate straight-line slope) within an angular range of 0°≦θ≦180° in the θ-h coordinate system and slopes up from the angular position of θ=0° to the angular position of θ=180° (or θ≈180°) moderately at an inclination angle less than flow angle φ of fuel injected or sprayed from nozzle hole (orifice) 4. As explained in more detail, a height h1 of sloped surface 32a of first sloped portion 32 of projected portion 30 within the angular range of 0°≦θ≦180°, measured in the orifice-axis direction (the direction of nozzle-body axis 24) is dimensioned to gradually increase from 0 to a predetermined maximum height hc along a swirl direction of swirling fuel flow (see the swirling-fuel-flow direction of FIG. 15). Projected portion 30 is also formed with a level portion 34 having a level surface that lies within an angular range of 180°≦θ≦360° in the θ-h coordinate system and in which a height of level portion 34 of projected portion 30 within the angular range 180°≦θ≦360°, measured in the direction of nozzle-body axis 24 is fixed constant and dimensioned to be equal to predetermined maximum height hc. In addition to the above, projected portion 30 is formed with a second sloped portion 36 having a sloped surface 36a at the angular position of θ=0° (or θ≈0°) in the θ-h coordinate system (in other words, at the angular position of θ=360° (or θ≈360°) in the θ-h coordinate system). Sloped surface 36a is formed on second sloped portion 36 to be substantially parallel to nozzle-body axis 24. That is to say, in the θ-h coordinate system, gradient $dh2/d\theta$ of sloped surface 36a of second sloped portion 36 is set or dimensioned to be substantially infinite. In other words, a height h2 of sloped surface 36a of second sloped portion 36 of projected portion 30, measured in the orifice-axis direction (the direction of nozzle-body axis 24) is dimensioned to gradually decrease from predetermined maximum height hc to 0 along the swirling-fuel-flow direction. The spray pattern of fuel sprayed or injected from the swirl-type DI fuel injector of the first embodiment having the first specified shape of projected portion 30 was analyzed or predicted by way of three-dimensional viscous fluid analysis, utilizing the computational mesh grid (computational region modeled) shown in FIG. 1. FIGS. 3 and 4 show simulation results of three-dimensional viscous fluid analysis. In FIG. 3, reference sign 8 denotes a conically or semi-spherically ended needle valve, reference sign 10 denotes a needle-valve seat, and reference sign 16 denotes a swirler located upstream of needle-valve seat 10 in order to give rotational momentum to fuel and to create swirling fuel flow as indicated by the arrows shown in FIG. 15. Nozzle hole 4 is formed in the tip of the nozzle body and valve seat 10 is formed in the nozzle body upstream of the nozzle hole. Needle valve 8 is movable up and down in a direction of nozzle-body axis 24 in a manner so as to open and close the nozzle hole by moving needle valve 8 apart from valve seat 10 and by seating needle valve 8 on valve seat 10. In a conventional manner, the axial position of needle valve 8 is electrically controlled in response to a control signal from an electronic fuel injection control unit (not shown). As appreciated from two different spray angles shown in FIG. 3, namely a right-hand side spray angle of 33 degrees and a left-hand side spray angle of 20 degrees, the swirl-type DI fuel injector of the first embodiment having the first specified shape of projected portion 30, provides an asymmetric spray shape at the tip of the orifice nozzle, owing to the asymmetric orifice shape. As can be seen from the horizontal cross section of FIG. 4, in the swirl-type DI fuel injector of the first embodiment having the first specified shape of projected portion 30, a collected fuel portion X is produced. On the other hand, a negligibly slight collected fuel portion Y is produced at an angular position being angularly offset from collected fuel portion X by approximately 90 degrees. Note that collected fuel portion Y produced in the DI fuel injector of the first embodiment having the first specified shape of projected portion 30, is remarkably less than second collected fuel portion Yc produced in the conventional DI fuel injector with the L-cut orifice nozzle. When the fuel evaporates in collected fuel portion X, corrected fuel portion X tends to form a denser air/fuel mixture. As can be appreciated from the horizontal cross section of FIG. 4, for better control of stratified combustion and reduced emissions, it is preferable to install or mount a spark plug (not shown) on a cylinder head such that the spark plug is provided to align with a position at which collected fuel portion X is produced. As set out above, according to the swirl-type DI fuel injector of the first embodiment, it is possible to effectively remove collected fuel portion Y which may cause unburned hydrocarbons (HCs), while providing collected fuel portion X that contributes to enlargement of the lean or ultra-lean stratified combustion AFR zone. This reconciles both improved fuel economy and enhanced emission control performance (reduced unburned hydrocarbons).

As discussed above, in the swirl-type DI fuel injector of the first embodiment having the first specified shape of the orifice nozzle tip, projected portion 30 is formed with first sloped portion 32 having up-sloped surface 32a that its height h1 gradually increases with the predetermined inclination angle along the swirling-fuel-flow direction of fuel injected from nozzle hole 4, but first sloped portion 32 does not have any up-sloped portion whose inclination angle exceeds flow angle φ of fuel injected, because of the predetermined inclination angle of up-sloped portion 32a less than flow angle φ over the angular range of 0°≦θ≦360° in the θ-h coordinate system. Therefore, there is no risk that fuel spray injected from nozzle hole 4 impinges on sloped surface 32a of first sloped portion 32 of projected portion 30. Additionally, an absolute value of the gradient of sloped surface 32a of first sloped portion 32 is dimensioned to be less than that of sloped surface 36a of second sloped portion 36. The gradient of sloped surface 32a of first sloped portion 32 is considered as a rate of change $dh1/d\theta$ of height h1 of sloped surface 32a with respect to angle θ. Likewise, the gradient of sloped surface 36a of second sloped portion 36 is regarded or considered as a rate of change $dh2/d\theta$ of height h2 of sloped surface 36a with respect to angle θ. The first necessary condition, in which the absolute value of the gradient of sloped surface 32a of first sloped portion 32 is dimensioned to be less than that of sloped surface 36a of second sloped portion 36, is defined or determined by the following inequality (as can be appreciated from comparison between a derivative $dh1/d\theta$ at a left-hand inflection point of the curve shown in FIG. 5 and a derivative $dh2/d\theta$ at a right-hand inflection point of the curve shown in FIG. 5, in the θ-h coordinate system).

$$|dh1/d\theta|_{max} < |dh2/d\theta|_{max}$$

where $|dh1/d\theta|_{max}$ is the absolute value of the maximum value $(dh1/d\theta)_{max}$ of the gradient of sloped surface 32a of first sloped portion 32, while $|dh2/d\theta|_{max}$ is the absolute value of the maximum value $(dh2/d\theta)_{max}$ of the gradient of sloped surface 36a of second sloped portion 36.

Also, the second necessary condition, in which the predetermined inclination angle of up-sloped portion 32a is less than flow angle φ over the angular range of 0°≦θ≦360° in the θ-h coordinate system, is defined or determined by the following inequality.

$$\tan \phi > \tan (dh1/d\theta)$$

where φ denotes the flow angle of fuel flow of fuel injected, while $dh1/d\theta$ denotes the gradient of first sloped portion 32.

That is, as can be seen from the first and second necessary conditions, i.e., the aforementioned two inequalities, in order to effectively remove collected fuel portion Y which may cause undesirable unburned hydrocarbons (HCs) while providing collected fuel portion X that contributes to enlargement of the lean or ultra-lean stratified combustion AFR zone, the absolute value $|dh2/d\theta|_{max}$ of the maximum value of the gradient of second sloped portion 36 is set so that the absolute value $|dh2/d\theta|_{max}$ is as large as possible, and additionally the absolute value $|dh1/d\theta|_{max}$ of the maximum value of the gradient of first sloped portion 32 is set so that the absolute value $|dh1/d\theta|_{max}$ is as small as possible.

Figure 6:
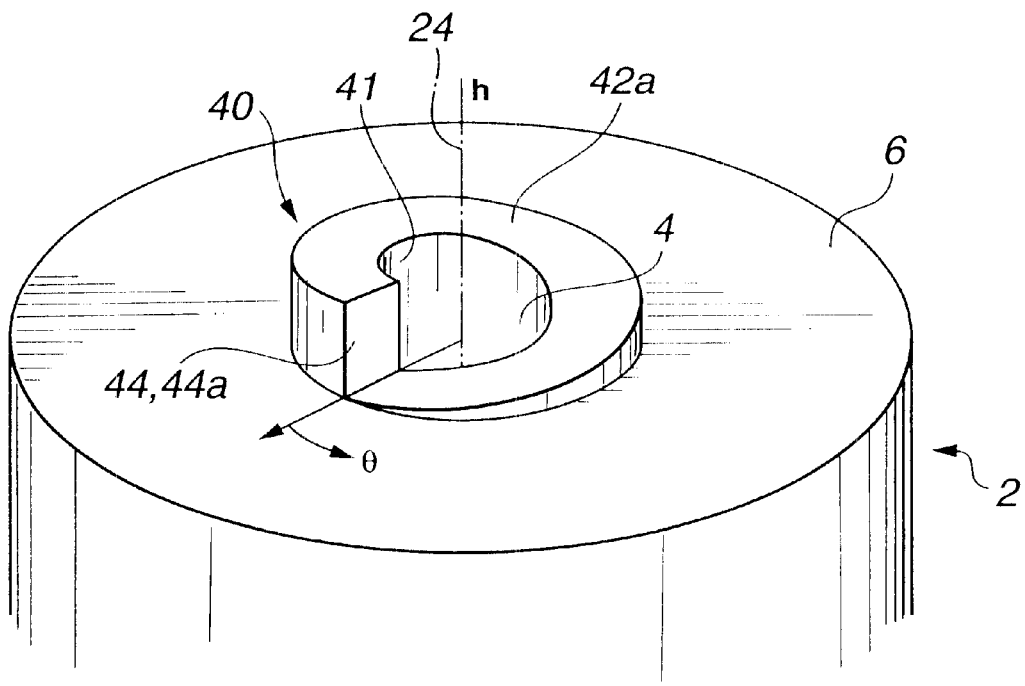
FIG. 6 is a perspective view illustrating an orifice nozzle tip in a second embodiment of a DI fuel injector of a DI gasoline engine.
Figure 7:
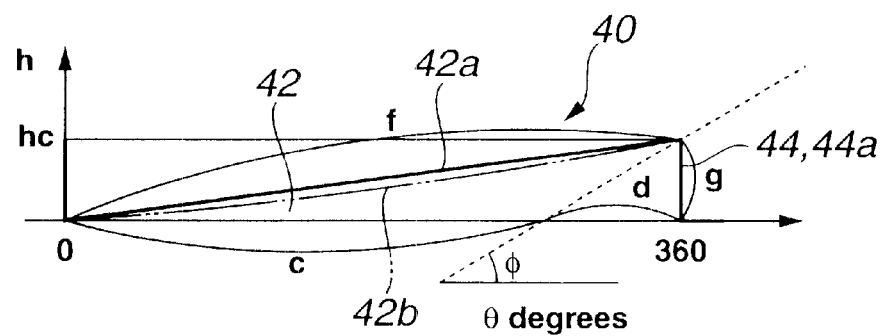
FIG. 7 is an explanatory view showing a developed shape of a projected portion 40 (the orifice nozzle tip of the fuel injector of the second embodiment) by way of the θ-h coordinate system.
Figure 8:
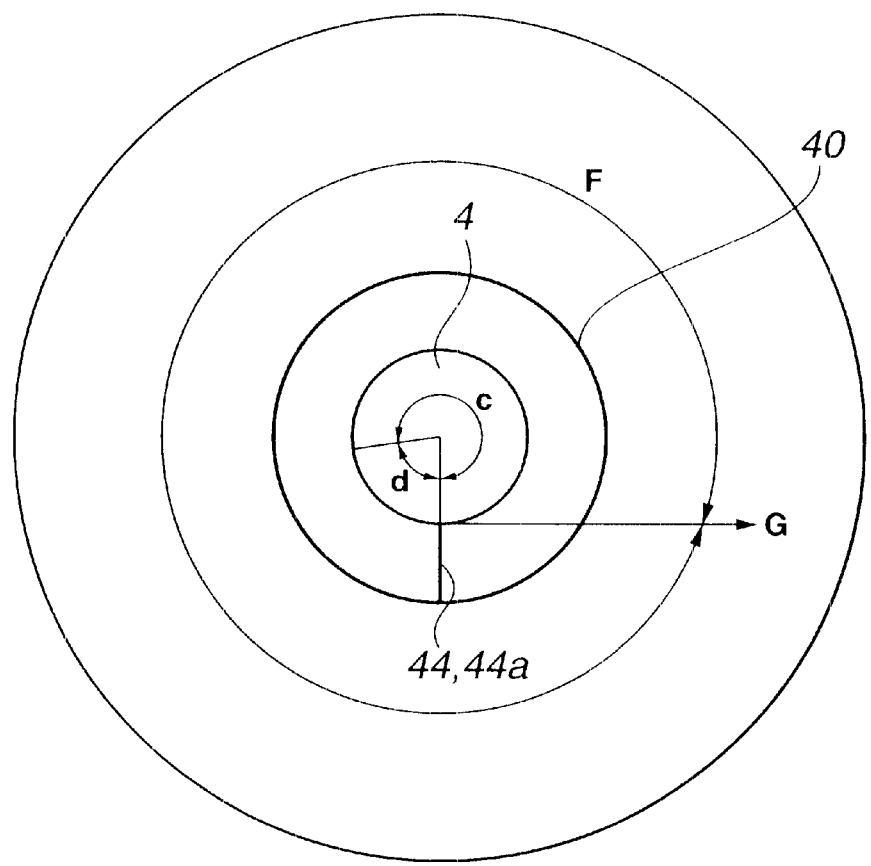
FIG. 8 is an explanatory view showing the fuel behavior of fuel sprayed out of the opening end of the orifice nozzle tip of the fuel injector of the second embodiment.

Referring now to FIGS. 6 through 8, there is shown the swirl-type DI fuel injector 2 of the second embodiment having a second specified shape of an orifice nozzle tip (a projected portion 40). In the same manner as projected portion 30 of the fuel injector of the first embodiment, projected portion 40 of the fuel injector of the second embodiment has an inner peripheral wall 41 parallel to the orifice axis (i.e., nozzle-body axis 24 of a nozzle body 6) and continuous with the inner peripheral wall surface of nozzle hole 4. Projected portion 40 is also formed within an angular range defined by $0° \leq \theta \leq 360°$. That is, projected portion 40 is provided at the opening end of nozzle hole 4 facing the combustion chamber (not shown), such that projected portion 40 is formed around the entire circumference of the edge portion of the opening end of nozzle hole 4. As clearly seen in FIGS. 6 and 7, projected portion 40 is formed with a first sloped portion 42 having a sloped surface 42a that has a constant gradient (that is, a straight-line slope) within an angular range of $0° \leq \theta \leq 360°$ in the θ-h coordinate system and slopes up from the angular position of $\theta=0°$ to the angular position of $\theta=360°$ (or $\theta \approx 360°$) moderately at an inclination angle less than flow angle φ of fuel injected or sprayed from nozzle hole 4. As explained in more detail, a height h1 of sloped surface 42a of first sloped portion 42 of projected portion 40 within the angular range of $0° \leq \theta \leq 360°$, measured in the orifice-axis direction (the direction of nozzle-body axis 24) is dimensioned to gradually increase from 0 to a predetermined maximum height hc along a swirl direction of swirling fuel flow. Note that projected portion 40 of the fuel injector of the second embodiment does not have a level surface portion as formed on projected portion 30 of the fuel injector of the first embodiment. Furthermore, projected portion 40 is formed with a second sloped portion 44 having a sloped surface 44a at the angular position of $\theta=0°$ (or $\theta \approx 0°$) in the θ-h coordinate system (in other words, at the angular position of $\theta=360°$ (or $\theta \approx 360°$) in the θ-h coordinate system). That is, in the θ-h coordinate system, gradient dh2/dθ of sloped surface 44a of second sloped portion 44 is set or dimensioned to be substantially infinite. In the swirl-type DI fuel injector of the second embodiment of FIGS. 6–8, fuel passing through a zone c (see FIGS. 7 and 8) of nozzle hole 4 is sprayed through a section f (see FIG. 7), that is, the entire circumference of the tip end of projected portion 40, and thus produces a fuel spray within an angular range F. On the other hand, fuel passing through a zone d (see FIGS. 7 and 8) of nozzle hole 4 is sprayed through a section g (see FIG. 7), and thus forms or produces a corrected fuel portion X due to the fuel sprayed out in the direction indicated by the arrow G. In the same manner as the first embodiment, in the fuel injector 2 of the second embodiment having the second specified shape of the orifice nozzle tip (projected portion 40), there is no risk that fuel spray injected from nozzle hole 4 impinges on sloped surface 42a of first sloped portion 42 of projected portion 40, thus preventing undesirable corrected fuel portion Y from being produced. In the fuel injector of the second embodiment having the second specified shape of projected portion 40, first sloped portion 42 is formed within the angular range of $0° \leq \theta \leq 360°$ in the θ-h coordinate system. In contrast to the above, in the fuel injector of the first embodiment having the first specified shape of projected portion 30, first sloped portion 32 is formed within the angular range of $0° \leq \theta \leq 180°$ in the θ-h coordinate system. That is, the gradient (inclination angle) of sloped surface 42a of first sloped portion 42 of projected portion 40 of the second embodiment is set or dimensioned to be less than that of sloped surface 32a of first sloped portion 32 of projected portion 30 of the first embodiment. This results in a more smooth horizontal cross section of fuel spray than that shown in FIG. 4.

Figure 9:
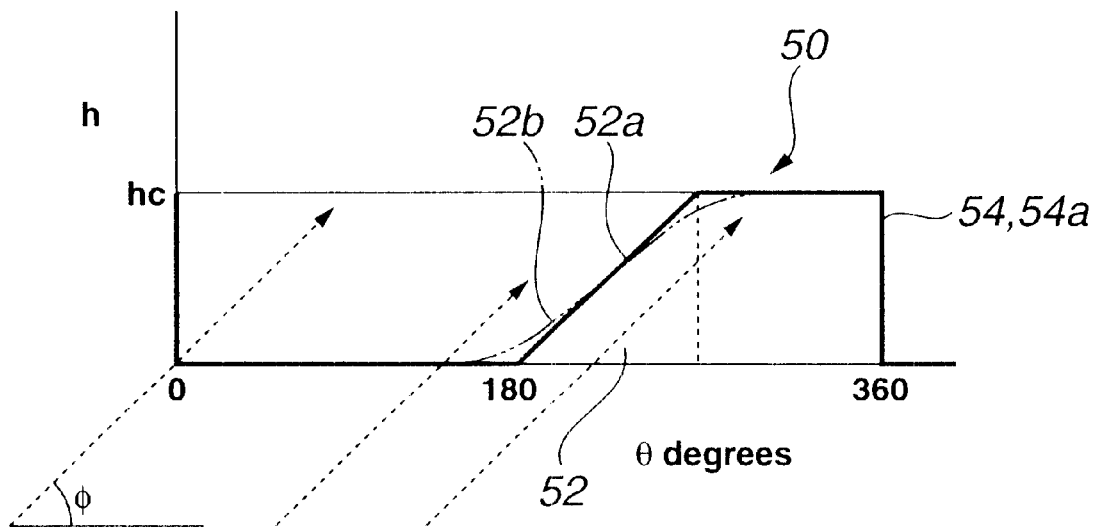
FIG. 9 is an explanatory view showing a developed shape of a projected portion 50 (an orifice nozzle tip of a fuel injector of a third embodiment) by way of the θ-h coordinate system.

Referring now to FIG. 9, there is shown the swirl-type DI fuel injector of the third embodiment having a third specified shape of an orifice nozzle tip (a projected portion 50). Projected portion 50 is formed within an angular range defined by $180° \leq \theta \leq 360°$ in the θ-h coordinate system. As clearly seen in FIG. 9, projected portion 50 is formed with a first sloped portion 52 having a sloped surface 52a that has a constant gradient (that is, a straight-line slope) within an angular range of $180° \leq \theta \leq 360°$ in the θ-h coordinate system and slopes up from the first angular position of $\theta=180°$ (or $\theta \approx 180°$) to the second angular position advanced in the swirl-fuel-flow direction relative to the first angular position moderately at an inclination angle less than flow angle φ of fuel injected or sprayed from nozzle hole (orifice) 4. As explained in more detail, a height h1 of sloped surface 52a of first sloped portion 52 of projected portion 50 within the angular range of $180° \leq \theta \leq 360°$, measured in the orifice-axis direction (the direction of nozzle-body axis 24) is dimensioned to gradually increase from 0 to predetermined maximum height hc along the swirling-fuel-flow direction. Projected portion 50 may also be formed with a level portion having a level surface that lies between the second angular position and a third angular position corresponding to $\theta=360°$ in the θ-h coordinate system and in which a height of the level portion of projected portion 50, measured in the direction of nozzle-body axis 24 is fixed constant and dimensioned to be equal to predetermined maximum height hc. In addition to the above, projected portion 50 is formed with a second sloped portion 54 having a sloped surface 54a at the angular position of $\theta=0°$ (or $\theta \approx 0°$) in the θ-h coordinate system (in other words, at the angular position of $\theta=360°$ (or $\theta \approx 360°$) in the θ-h coordinate system). Sloped surface 54a is formed on second sloped portion 54 to be substantially parallel to nozzle-body axis 24. That is to say, in the θ-h coordinate system, gradient dh2/dθ of sloped surface 54a of second sloped portion 54 is set or dimensioned to be substantially infinite. Projected portion 50 is provided at the edge portion of the opening end of nozzle hole 4 facing the combustion chamber (not shown). The projected portion 50 of the fuel injector of the third embodiment shown in FIG. 9 can be easily produced by machining projected portion 20 of the conventional fuel injector with the L-cut orifice nozzle shape as shown in FIGS. 14–19. The shape of the orifice nozzle tip (projected portion 50) of the fuel injector of the third embodiment of FIG. 9 is superior in reduced production costs.

In the first, second, and third embodiments, sloped surface (32a; 42a; 52a) of first sloped portion (32; 42; 52) is formed as a straight-line slope in the θ-h coordinate system. In lieu thereof, the sloped surface of first sloped portion (32; 42; 52) may be formed as a curved-line slope (see curved two-dotted line 32b of FIG. 2, curved two-dotted line 42b of FIG. 7, and curved two-dotted line 52b of FIG. 9) that the maximum value $(dh1/d\theta)_{max}$ of the gradient of the first sloped portion is dimensioned to be less than flow angle φ.

Figure 10:
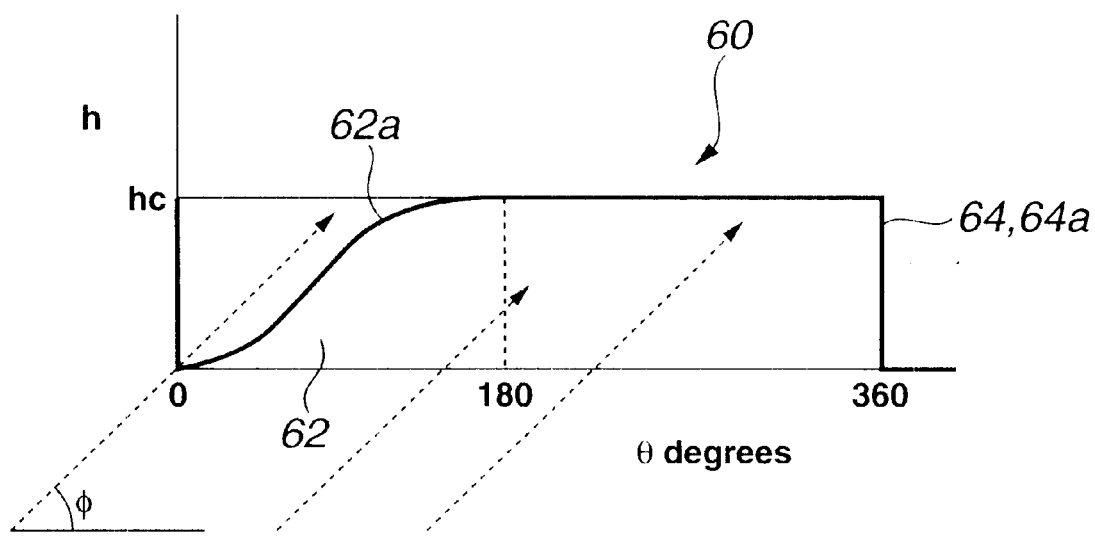
FIG. 10 is an explanatory view showing a developed shape of a projected portion 60 (an orifice nozzle tip of a fuel injector of a fourth embodiment) by way of the θ-h coordinate system.
Figure 11:
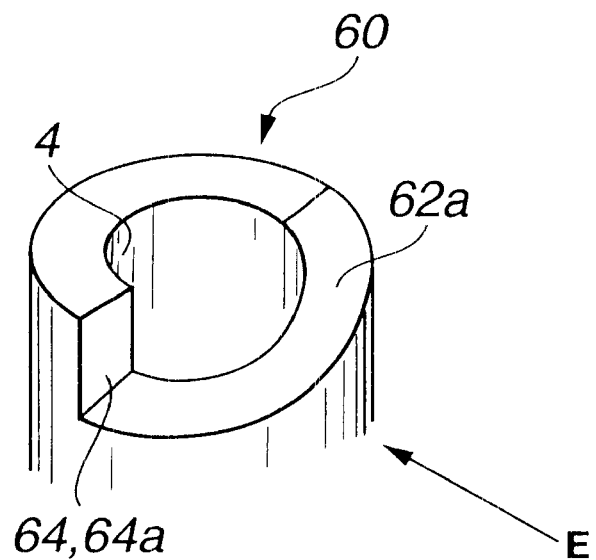
FIG. 11 is a perspective view illustrating the orifice nozzle tip of the DI fuel injector of the fourth embodiment shown in FIG. 10.
Figure 12:
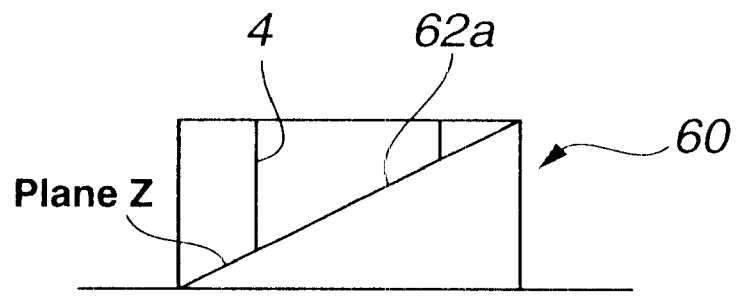
FIG. 12 is a side view of the orifice nozzle tip of the DI fuel injector of the fourth embodiment, taken in the direction of the arrow E in FIG. 11.
Figure 13:
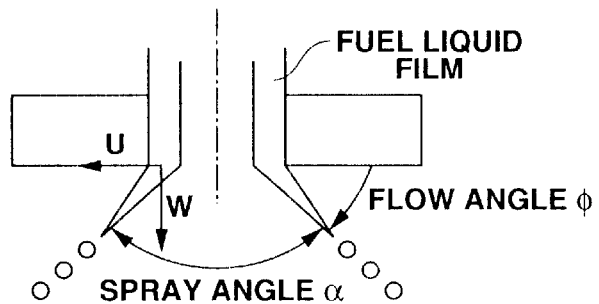
FIG. 13 is an explanatory view showing the relationship between flow angle φ and spray angle α.
Figure 14:
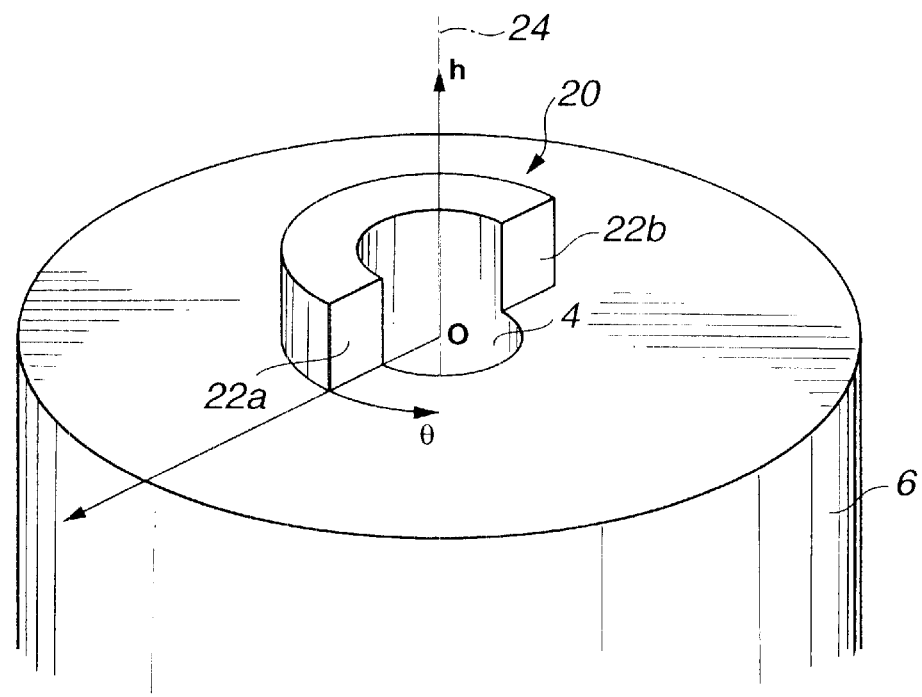
FIG. 14 is a perspective view illustrating the L-cut orifice nozzle tip in the prior art DI fuel injector.

Referring now to FIGS. 10 through 12, there is shown the swirl-type DI fuel injector of the fourth embodiment having a fourth specified shape of an orifice nozzle tip (a projected portion 60). Projected portion 60 is formed within an angular range defined by $0° \leq \theta \leq 180°$ in the θ-h coordinate system, and projected portion 60 is provided at the edge portion of the opening end of nozzle hole 4 facing the combustion chamber (not shown). As shown in FIGS. 10–12, projected portion 60 is formed with a first sloped portion 62 having a sloped surface 62a within an angular range defined by $0° \leq \theta \leq 180°$ in the θ-h coordinate system. As best seen in FIGS. 11 and 12, a gradient (dh1/dθ) of sloped surface 62a of first sloped portion 62 is specified by a plane Z inclined with respect to a plane (e.g., the previously-noted reference plane) normal to the central axis of nozzle hole 4, nozzle-body axis 24 or the orifice axis. As can be seen from the curved-line slope within the angular range of $0° \leq \theta \leq 180°$ in the θ-h coordinate system, sloped surface 62a of first sloped surface 62 is formed and dimensioned to be a substantially sine-curved line. As described in more detail, a height h1 of sloped surface 62a of first sloped portion 62 of projected portion 60 within the angular range of $0° \leq \theta \leq 180°$, measured in the orifice-axis direction (the direction of nozzle-body axis 24) is dimensioned to gradually increase from 0 to predetermined maximum height hc along the swirling-fuel-flow direction. Projected portion 60 is also formed with a level portion having a level surface that lies within an angular range from approximately 180° to 360° in the θ-h coordinate system and in which a height of the level portion of projected portion 60, measured in the direction of nozzle-body axis 24 is fixed constant and dimensioned to be equal to predetermined maximum height hc. In the fuel injector of the fourth embodiment of FIGS. 10–12, an inclination angle of plane Z inclined with respect to the plane normal to the central axis of nozzle hole 4 is set or dimensioned so that the maximum value $(dh1/d\theta)_{max}$ of the gradient of first sloped portion 62 is less than flow angle φ. Furthermore, projected portion 60 is formed with a second sloped portion 64 having a sloped surface 64a at the angular position of θ=0° (or θ≈0°) in the θ-h coordinate system (in other words, at the angular position of θ=360° (or θ≈360°) in the θ-h coordinate system). Sloped surface 64a is formed on second sloped portion 64 to be substantially parallel to nozzle-body axis 24. That is, in the θ-h coordinate system, gradient dh2/dθ of sloped surface 64a of second sloped portion 64 is set or dimensioned to be substantially infinite. As can be appreciated from the obliquely-cut shape of the orifice nozzle tip (projected portion 60) shown in FIGS. 11 and 12, it is easy to produce a partly taper-cut orifice nozzle tip by machining or cutting a part of a substantially cylindrical hollow orifice nozzle tip by plane Z, thus reducing production costs.

The entire contents of Japanese Patent Application No. P2000-360774 (filed Nov. 28, 2000) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A fuel injector of an internal combustion engine, comprising:
 a nozzle body having a nozzle hole formed in a tip of the nozzle body and a valve seat formed in the nozzle body upstream of the nozzle hole;
 a needle valve movable in a direction of an axis of the nozzle body to open and close the nozzle hole by moving the needle valve apart from the valve seat and by seating the needle valve on the valve seat;
 a swirler located upstream of the valve seat to give rotational momentum to fuel to be injected from the nozzle hole and to create swirling fuel flow;
 a projected portion whose inner peripheral wall is continuous with an inner peripheral wall surface of the nozzle hole, the projected portion being formed on an edge portion of an opening end of the nozzle hole so that a height of the projected portion, measured in a direction of an orifice axis of the nozzle hole, varies along a circumferential direction of the nozzle hole;
 the projected portion comprising:
  (i) a first sloped portion having a sloped surface that a height h1 of the sloped surface, measured in the orifice-axis direction, is dimensioned to gradually increase along a direction of the swirling fuel flow; and
  (ii) a second sloped portion having a sloped surface that a height h2 of the sloped surface, measured in the orifice-axis direction, is dimensioned to gradually decrease along the swirling-fuel-flow direction;
 a gradient of the sloped surface of the first sloped portion being defined by dh1/dθ and a gradient of the sloped surface of the second sloped portion being defined by dh2/dθ, in a θ-h coordinate system corresponding to a cylindrical coordinate system in which a reference plane is defined as a plane normal to the orifice axis and cutting a section of the projected portion that the height of the projected portion becomes smallest, an intersection point between the orifice axis and the reference plane is chosen as an origin, an angular position of a point of the edge portion of the opening end of the nozzle hole with respect to the origin serving as a reference is represented by an angle θ ranging from 0° to 360°, the height of the projected portion in the orifice-axis direction with respect to the reference plane serving as a reference is represented by a height h, a θ-axis representing the angle θ is taken as an axis of abscissa, and an h-axis representing the height h is taken as an axis of ordinate; and
 the projected portion being dimensioned to satisfy an inequality:

$$|dh1/d\theta|_{max} < |dh2/d\theta|_{max}$$

where $|dh1/d\theta|_{max}$ is an absolute value of a maximum value of the gradient of the sloped surface of the first sloped portion, and $|dh2/d\theta|_{max}$ is an absolute value of a maximum value of the gradient of the sloped surface of the second sloped portion.

2. The fuel injector as claimed in claim 1, wherein the first sloped portion has the sloped surface formed as a moderate straight-line slope within an angular range from 0° to substantially 180° in the θ-h coordinate system, and the second sloped portion has the sloped surface substantially parallel to the orifice axis so that the gradient dh2/dθ of the sloped surface of the second sloped portion is dimensioned to be substantially infinite.

3. The fuel injector as claimed in claim 1, wherein the first sloped portion has the sloped surface formed as a moderate curved-line slope within an angular range from 0° to substantially 180° in the θ-h coordinate system, and the second sloped portion has the sloped surface substantially parallel to the orifice axis so that the gradient dh2/dθ of the sloped surface of the second sloped portion is dimensioned to be substantially infinite.

4. The fuel injector as claimed in claim 1, wherein the projected portion is formed around an entire circumference of the edge portion of the opening end of the nozzle hole, and the first sloped portion has the sloped surface formed as a moderate straight-line slope within an angular range from 0° to substantially 360° in the θ-h coordinate system, and the second sloped portion has the sloped surface at an angular position of substantially 360° in the θ-h coordinate system, the sloped surface of the second sloped portion being substantially parallel to the orifice axis so that the gradient dh2/dθ of the sloped surface of the second sloped portion is dimensioned to be substantially infinite.

5. The fuel injector as claimed in claim 1, wherein the projected portion is formed around an entire circumference of the edge portion of the opening end of the nozzle hole, and the first sloped portion has the sloped surface formed as a moderate curved-line slope within an angular range from 0° to substantially 360° in the θ-h coordinate system, and the second sloped portion has the sloped surface at an angular position of substantially 360° in the θ-h coordinate system, the sloped surface of the second sloped portion being substantially parallel to the orifice axis so that the gradient dh2/dθ of the sloped surface of the second sloped portion is dimensioned to be substantially infinite.

6. The fuel injector as claimed in claim 1, wherein the projected portion is formed so that the height of the projected portion is zero within an angular range from 0° to substantially 180° in the θ-h coordinate system, and the first sloped portion has the sloped surface formed as a moderate straight-line slope within an angular range from substantially 180° to substantially 360° in the θ-h coordinate system, and the second sloped portion has the sloped surface at an angular position of substantially 360° in the θ-h coordinate system, the sloped surface of the second sloped portion being substantially parallel to the orifice axis so that the gradient dh2/dθ of the sloped surface of the second sloped portion is dimensioned to be substantially infinite.

7. The fuel injector as claimed in claim 1, wherein the projected portion is formed so that the height of the projected portion is zero within an angular range from 0° to substantially 180° in the θ-h coordinate system, and the first sloped portion has the sloped surface formed as a moderate curved-line slope within an angular range from substantially 180° to substantially 360° in the θ-h coordinate system, and the second sloped portion has the sloped surface at an angular position of substantially 360° in the θ-h coordinate system, the sloped surface of the second sloped portion being substantially parallel to the orifice axis so that the gradient dh2/dθ of the sloped surface of the second sloped portion is dimensioned to be substantially infinite.

8. The fuel injector as claimed in claim 1, wherein the first sloped portion has the sloped surface formed as a moderate curved-line slope within an angular range from 0° to substantially 180° in the θ-h coordinate system, and the height h1 and the gradient dh1/dθ of the sloped surface of the first sloped portion are specified by a plane inclined with respect to the reference plane, and the sloped surface of the second sloped portion is substantially parallel to the orifice axis so that the gradient dh2/dθ of the sloped surface of the second sloped portion is dimensioned to be substantially infinite.

9. The fuel injector as claimed in claim 8, wherein the sloped surface of the first sloped portion is dimensioned to be a substantially sine-curved line within the angular range from 0° to substantially 180° in the θ-h coordinate system.

10. The fuel injector as claimed in claim 1, wherein:
a flow angle φ between a plane normal to the orifice axis and a fuel-flow direction as viewed from a cross section of the orifice-axis direction is defined by an expression:

$$\phi = \tan^{-1}(W/U)$$

where W is an axial fuel flow velocity component in the orifice-axis direction and U is a circumferential fuel flow velocity component in the circumferential direction of the nozzle hole; and the flow angle φ being dimensioned to satisfy an inequality:

$$\tan \phi > \tan (dh1/d\theta)$$

where φ is the flow angle of fuel flow of fuel injected, and dh1/dθ is the gradient of the sloped surface of the first sloped portion.

11. A fuel injector of a gasoline direct-injection internal combustion engine, comprising:

a nozzle body having a nozzle hole formed in a tip of the nozzle body and a valve seat formed in the nozzle body upstream of the nozzle hole;

a needle valve movable in a direction of an axis of the nozzle body to open and close the nozzle hole by moving the needle valve apart from the valve seat and by seating the needle valve on the valve seat;

a swirler located upstream of the valve seat to give rotational momentum to fuel to be injected from the nozzle hole and to create swirling fuel flow;

a substantially cylindrical-hollow projected portion whose inner peripheral wall is parallel to an orifice axis of the nozzle hole and is continuous with an inner peripheral wall surface of the nozzle hole, the projected portion being formed on an edge portion of an opening end of the nozzle hole so that a height of the projected portion, measured in a direction of the orifice axis corresponding to the nozzle-body axis, varies along a circumferential direction of the nozzle hole;

the projected portion comprising:

(i) a first sloped portion having a sloped surface that a height h1 of the sloped surface, measured in the orifice-axis direction, is dimensioned to gradually increase along a direction of the swirling fuel flow, the first sloped portion sloping up from a first angular position to a second angular position advanced in the swirling-fuel-flow direction relative to the first angular position moderately at a gradient less than a flow angle φ of fuel injected from the orifice nozzle, the flow angle φ between a plane normal to the orifice axis and a fuel-flow direction as viewed from a cross section of the orifice-axis direction being defined by an expression:

$$\phi = \tan^{-1}(W/U)$$

where W is an axial fuel flow velocity component in the orifice-axis direction and U is a circumferential fuel flow velocity component in the circumferential direction of the nozzle hole; and (ii) a second sloped portion having a sloped surface that a height h2 of the sloped surface, measured in the orifice-axis direction, is dimensioned to gradually decrease along the swirling-fuel-flow direction;

the gradient of the sloped surface of the first sloped portion being defined by dh1/dθ and a gradient of the sloped surface of the second sloped portion being defined by dh2/dθ, in a θ-h coordinate system corresponding to a cylindrical coordinate system in which a reference plane is defined as a plane normal to the orifice axis and cutting a section of the projected portion that the height of the projected portion becomes smallest, an intersection point between the orifice axis and the reference plane is chosen as an origin, an angular position of a point of the edge portion of the opening end of the nozzle hole with respect to the origin serving as a reference is represented by an angle θ ranging from 0° to 360°, the height of the projected portion in the orifice-axis direction with respect to the reference plane serving as a reference is represented by a height h, a θ-axis representing the angle θ is taken as an axis of abscissa, and an h-axis representing the height h is taken as an axis of ordinate; and the projected portion being dimensioned to satisfy an inequality:

$$|dh1/d\theta|_{max} < |dh2/d\theta|_{max}$$

where $|dh1/d\theta|_{max}$ is an absolute value of a maximum value of the gradient of the sloped surface of the first sloped portion, and $|dh2/d\theta|_{max}$ is an absolute value of a maximum value of the gradient of the sloped surface of the second sloped portion.

12. The fuel injector as claimed in claim 11, wherein the first sloped portion has the sloped surface formed as a straight-line slope within an angular range from 0° to substantially 180° in the θ-h coordinate system, and the second sloped portion has the sloped surface substantially parallel to the orifice axis so that the gradient dh2/dθ of the sloped surface of the second sloped portion is dimensioned to be substantially infinite.

13. The fuel injector as claimed in claim 11, wherein the first sloped portion has the sloped surface formed as a curved-line slope within an angular range from 0° to substantially 180° in the θ-h coordinate system, and the second sloped portion has the sloped surface substantially parallel to the orifice axis so that the gradient dh2/dθ of the sloped surface of the second sloped portion is dimensioned to be substantially infinite.

14. The fuel injector as claimed in claim 11, wherein the projected portion is formed around an entire circumference of the edge portion of the opening end of the nozzle hole, and the first sloped portion has the sloped surface formed as a straight-line slope within an angular range from 0° to substantially 360° in the θ-h coordinate system, and the second sloped portion has the sloped surface at an angular position of substantially 360° in the θ-h coordinate system, the sloped surface of the second sloped portion being substantially parallel to the orifice axis so that the gradient dh2/dθ of the sloped surface of the second sloped portion is dimensioned to be substantially infinite.

15. The fuel injector as claimed in claim 11, wherein the projected portion is formed around an entire circumference of the edge portion of the opening end of the nozzle hole, and the first sloped portion has the sloped surface formed as a curved-line slope within an angular range from 0° to substantially 360° in the θ-h coordinate system, and the second sloped portion has the sloped surface at an angular position of substantially 360° in the θ-h coordinate system, the sloped surface of the second sloped portion being substantially parallel to the orifice axis so that the gradient dh2/dθ of the sloped surface of the second sloped portion is dimensioned to be substantially infinite.

16. The fuel injector as claimed in claim 11, wherein the projected portion is formed so that the height of the projected portion is zero within an angular range from 0° to substantially 180° in the θ-h coordinate system, and the first sloped portion has the sloped surface formed as a straight-line slope within an angular range from substantially 180° to substantially 360° in the θ-h coordinate system, and the second sloped portion has the sloped surface at an angular position of substantially 360° in the θ-h coordinate system, the sloped surface of the second sloped portion being substantially parallel to the orifice axis so that the gradient dh2/dθ of the sloped surface of the second sloped portion is dimensioned to be substantially infinite.

17. The fuel injector as claimed in claim 11, wherein the projected portion is formed so that the height of the projected portion is zero within an angular range from 0° to substantially 180° in the θ-h coordinate system, and the first sloped portion has the sloped surface formed as a curved-line slope within an angular range from substantially 180° to substantially 360° in the θ-h coordinate system, and the second sloped portion has the sloped surface at an angular position of substantially 360° in the θ-h coordinate system, the sloped surface of the second sloped portion being substantially parallel to the orifice axis so that the gradient dh2/dθ of the sloped surface of the second sloped portion is dimensioned to be substantially infinite.

18. The fuel injector as claimed in claim 11, wherein the first sloped portion has the sloped surface formed as a curved-line slope within an angular range from 0° to substantially 180° in the θ-h coordinate system, and the height h1 and the gradient dh1/dθ of the sloped surface of the first sloped portion are specified by a plane inclined with respect to the reference plane, and the sloped surface of the second sloped portion is substantially parallel to the orifice axis so that the gradient dh2/dθ of the sloped surface of the second sloped portion is dimensioned to be substantially infinite.

19. The fuel injector as claimed in claim 18, wherein the sloped surface of the first sloped portion is dimensioned to be a substantially sine-curved line within the angular range from 0° to substantially 180° in the θ-h coordinate system.

* * * * *